United States Patent [19]
Kim

[11] Patent Number: 5,860,775
[45] Date of Patent: Jan. 19, 1999

[54] SPINDLE POSITION ORIENTATION APPARATUS OF BORING MACHINE

[75] Inventor: Do Chul Kim, Kyungsangnam-do, Rep. of Korea

[73] Assignee: Hyundai Motor Company, Seoul, Rep. of Korea

[21] Appl. No.: 658,529

[22] Filed: Jun. 5, 1996

[51] Int. Cl.⁶ ..................................................... B23Q 5/20
[52] U.S. Cl. ..................... 408/124; 408/241 R; 409/231; 483/35
[58] Field of Search ..................................... 408/124, 130, 408/241 R; 483/34, 35; 409/231

[56] References Cited

U.S. PATENT DOCUMENTS

| | | | |
|---|---|---|---|
| 2,902,890 | 9/1959 | Staples | 408/124 |
| 3,587,359 | 6/1971 | McCash et al. | 408/124 |
| 4,356,609 | 11/1982 | Wollermann | 483/35 |

*Primary Examiner*—Steven C. Bishop
*Attorney, Agent, or Firm*—Finnegan, Henderson, Farabow, Garrett & Dunner, L.L.P.

[57] ABSTRACT

The spindle position orientation apparatus of a boring machine includes a main spindle attached to a casing and around which a cylindrical cam is fixed, a slider disposed on a guide rod to be movable right and left thereby rotating the cylindrical cam, and a limit switch which is opened and closed by a dog attached to a piston. The piston is disposed in a hydraulic cylinder fixed to the casing, one end of the piston is fixed to the slider and the dog is formed on the other end.

3 Claims, 2 Drawing Sheets

SPINDLE POSITION ORIENTATION APPARATUS OF BORING MACHINE

BACKGROUND

This invention relates to a spindle angular position orientation apparatus of a boring machine and, more particularly, to a spindle position orientation apparatus of a boring machine used for machining parts that are mass-produced, such as automotive components.

The present boring machine is used for drilling holes in mass-produced parts, such as automotive components. For good performance, the rotational orientation of a cutting tool mounted on the main spindle must be always constant when starting to cut new parts that are mounted for machining. A separate motor able to regulate its speed is typically used to so orient the main spindle. But, when this separate motor with regulable speed is used, the price of the boring machine is increased. Additionally, it is difficult to correctly orient the cutting tool to the starting orientation because of electrical errors occurring in the motor and in its controls.

SUMMARY

The object of the invention is to provide a spindle position orientation apparatus for a boring machine that utilizes cams and a hydraulic actuation mechanism, without using an electrical motor. This apparatus is inexpensive and produces little error in positioning the cutting tool.

To achieve the above objects, the present invention is a spindle angular position orientation apparatus for a boring machine which comprises a main spindle disposed within a casing, a cylindrical cam fixed around the main spindle, a slider disposed on a guide rod to be movable parallel to the length of the cam thereby rotating the cylindrical cam as it moves, a limit switch which is opened and closed by a dog attached to one end of a piston, wherein the piston is disposed in a hydraulic cylinder fixed to the casing, and one end of the piston opposite to the end where the dog is formed is fixed to the slider.

BRIEF DESCRIPTION OF THE DRAWINGS

Further objects and other advantages of the present invention will become apparent from the following description in conjunction with the attached drawings, in which.

DESCRIPTION

Embodiments of the invention will be described below in conjunction with the accompanying drawings.

Figure 1:
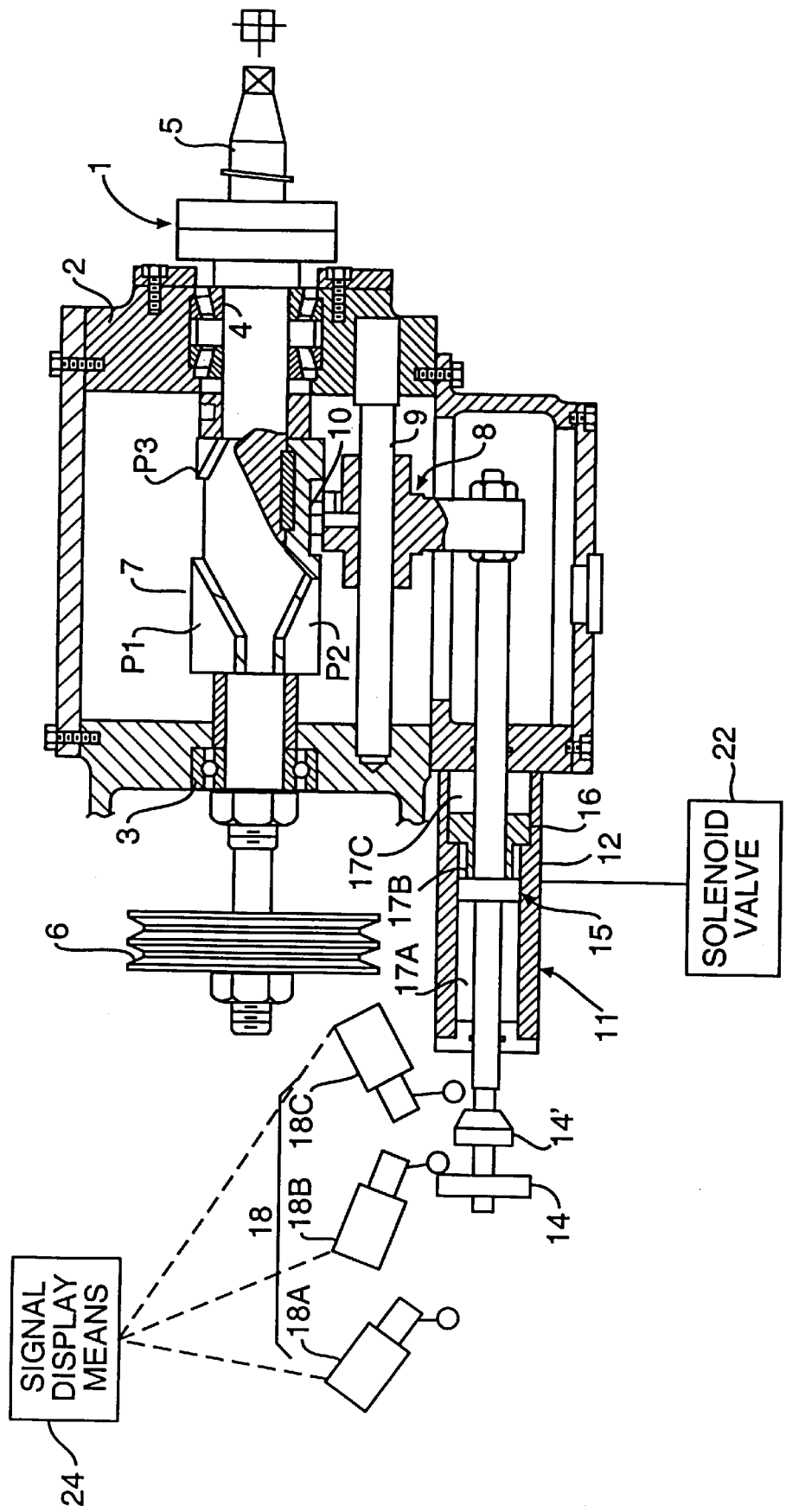
FIG. 1 is a sectional view of a first embodiment of the invention.

FIG. 1 is a section view of a first embodiment of the invention, the reference numeral 1 refers to a main spindle which is supported by a casing 2 and is able to rotate freely within bearings 3 and 4. An arbor 5 is disposed at one end of the spindle and a pulley 6 is fixed to the other end. A cylindrical cam 7 is fixed to the arbor within the casing 2.

The reference numeral 8 refers to a slider, which is disposed on two guide rods 9 fixed to the casing 2, and is movable right and left parallel to the arbor length so that a follower 10 fixed to the slider engages the cylindrical cam 7 fixed to the main spindle 1, and causes cam and spindle to rotate. A hydraulic mechanism 11 described below moves the slider, thereby rotating the main spindle 1.

The reference numeral 11 indicates the hydraulic mechanism moving the slider, which comprises a hydraulic cylinder 12 fixed to a side face of the casing 2, and a piston 15 having one end fixed to the slider 8 and dogs 14 and 14' formed on the other end. A traveling piston 16 is slidably disposed on a narrow portion of piston 15. Hydraulic chambers 17A, 17B and 17C are formed within cylinder 12 between pistons 15, 16, and the ends of cylinder 12, and are connected to conduits leading to a hydraulic pump 20 and a solenoid valve 22.

Reference numeral 18 refers to a set of limit switches, wherein the limit switch 18A is opened and closed by the dog 14 and indicates whether slider 10 is moved to the left limit of its travel, as shown in FIG. 1, in a position where it acts on cam 7 to rotate an arbor 5 or cutting tool arbor 5' to the predetermined starting orientation. The limit switches 18B and 18C opened and closed by the dog 14' are for confirming one position of the slider 8 and follower 10 when the boring machine is configured for drilling the work piece, and another position taken when a correcting action is performed on the stopped machine, as described later. Switches 18B and 18C control the solenoid valve 22 and, at the same time, display the position on a signal displaying means 24.

Figure 2A:
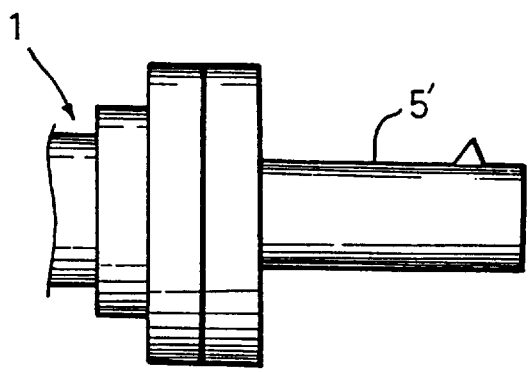
FIGS. 2A and 2B show a detail of another embodiment of the invention.
Figure 2B:
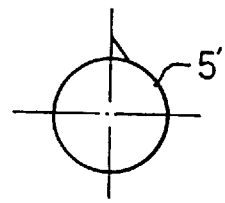

FIGS. 2A and 2B show another embodiment of the invention, different from the first embodiment because a cutting tool arbor 5', instead of the arbor 5, is attached to the main spindle 1.

Figure 3:
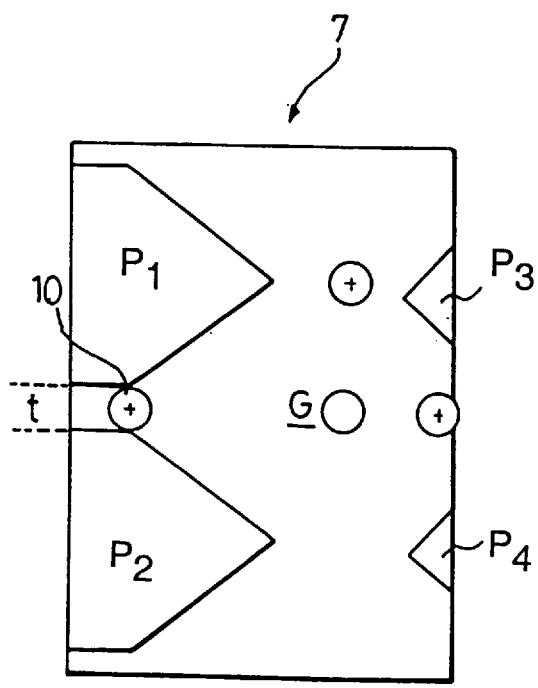
FIG. 3 is an unwrapped projection of the cylindrical cam in accordance with the invention.

FIG. 3 is an unwrapped projection of the cylindrical cam 7 in accordance with the invention. At one end of the cylinder there are triangular shaped position orientation projections P1 and P2, projecting from the outer surface of the cylindrical cam. The two orientation projections are separated by a gap t, having the same diameter as follower 10. The other end of the cylinder has two correcting projections P3 and P4, which are smaller than the position orientation projections P1 and P2, and have their vertices offset by 3 to 5 mm from the vertices of the position orientation projections P1 and P2. A groove G is formed on the surface of the cam, between the projections P1, P2, P3 and P4. Also, the length of the cylindrical cam 7 is equal to the sum of the lengths of hydraulic chambers 17A and 17C, when the follower 10 is positioned in the gap t.

When the boring machine is ready to begin cutting, the follower 10 of the cylindrical cam 7, according to the invention, is positioned in the groove G between the projections P1 and P2 by actuating the hydraulic mechanism 11. In that position, the dog 14' moves the limit switch 18B to the "ON" position, confirming that the follower is in the cutting position and displaying this state on the signal displaying means 24.

After cutting is completed, the main spindle 1 is stopped by a stopping signal to the motor, and hydraulic pressure is supplied to the hydraulic chamber 17B, resulting in the tip of the cutting tool 5' being rotated to a predetermined angular position. As the piston 15 moves to the left, the follower 10 fixed to the slider 8 also moves to the left, and slides along the angled surfaces of position orientation projections P1 and P2 of cam 7, thereby rotating the cylindrical cam 7, until the follower 10 is positioned in the gap t between the position orientation projections P1 and P2 of the cylindrical cam 7. In the process, the arbor 5 or cutting tool arbor 5' is rotated to a position determined by the location of gap t on the cam. When follower 10 reaches that position, the solenoid valve 22 is activated by the dog 14 opening limit switch 18A and, at the same time, the position of follower 10 is displayed on the signal display means 24.

During these steps, the hydraulic chamber 17C is always supplied with constant hydraulic pressure by a solenoid valve 22, so that sliding piston 16 functions as a stopper for the piston 15, in the position shown in FIG. 1. Because the cross sectional area of the hydraulic chamber 17C is larger than the sum of the areas of the hydraulic chambers 17A and 17B, piston 16 can function as a stopper for piston 15, even though the pressures in the hydraulic chambers 17A, 17B and 17C are all the same.

However, when hydraulic pressure is supplied to hydraulic chamber 17B, but the limit switch 18A is not turned "ON" by the dog 14 disposed on the other end of the piston 15, it is assumed that the follower 10 is positioned on the center vertex of one of the orientation projection P1 or P2, so that it is unable to slide along the angled surfaces of the orientation projections, and the piston 15 is prevented from moving to the left. When the follower 10 is in this stable angular position against the vertex of one of the orientation projections, the cam and spindle assembly must be rotated by a small amount, so that the follower will be able to slide along one of the angled surfaces of the orientation projections. This small rotation is accomplished by operating the solenoid valve 22 to supply the hydraulic pressure to the hydraulic chamber 17A, and remove the hydraulic pressure from the hydraulic chamber 17C. Then, the traveling piston 16 moves to the right end of the hydraulic cylinder 12 and, at the same time, piston 15 moves right until it contacts traveling piston 16. Follower 10 which is moved by piston 15 also moves right, and contacts the side surface of one of the correcting projection P3 or P4. Since the vertices of projections P3 and P4 are offset from the vertices of projections P1 and P2, follower 10 slides along the angled surfaces of projections P3 or P4, while moving to the right, thereby rotating the cylindrical cam 7. When follower 10 is located at the right end of its travel, between the correcting projections P3 and P4, the limit switch 18C indicating that follower 10 is in the correcting position is turned "ON" by the dog 14', and this state is displayed on the signal displaying means.

After the above operation for slightly turning the cam is completed, hydraulic pressure is supplied to the hydraulic chamber 17C again, so that the traveling piston 16 contacts with the piston 15, and hydraulic pressure is supplied to the hydraulic chamber 17B so that the piston 15 moves to the left until the follower 10, now no longer aligned with the vertices of projections P1 or P2, reaches the gap t between the position orientation projections P1 and P2 of the cylindrical cam 7. The arbor 5 or cutting tool arbor 5' is thus rotated to the desired orientation, and the limit switch 18A for indicating the correcting position of the cam and follower is turned "ON" by the dog 14. This state is displayed on the signal displaying means.

The spindle position orientation apparatus of the present invention described above has a cylindrical cam fixed to the main spindle and rotated by a slider operated by a hydraulic mechanism. By rotating the cam, the slider rotates the arbor or cutting tool arbor to a preselected starting orientation. The apparatus has a simple construction and has trouble free operation, and the positioning of the arbor or cutting tool arbor to a precise position can be obtained by only utilizing the hydraulic mechanism.

Although preferred embodiments of the present invention have been described in detail above, it should be clearly understood that many variations and/or modifications of the basic inventive concepts herein taught, which may appear to those skilled in the present art, will still fall within the spirit and scope of the present invention, as defined in the appended claims.

I claim:

1. A spindle position orientation apparatus of a boring machine comprising:

a main spindle rotatably disposed in a casing; a cylindrical cam fixed around the main spindle;

a slider disposed on a guide rod for moving right and left thereby engaging and rotating the cylindrical cam;

a piston disposed in a hydraulic cylinder fixed to the casing, the piston having one end thereof fixed to the slides; and a limit switch for reporting a position of the piston, the limit switch being opened and closed by a dog mounted on one end of the piston.

2. A spindle position orientation apparatus of a boring machine comprising:

a main spindle rotatably disposed in a casing;

a cylindrical cam fixed around the main spindle;

a slider disposed on a guide rod for moving right and left thereby engaging and rotating the cylindrical cam;

a piston disposed in a hydraulic cylinder fixed to the casing, the piston having one end thereof fixed to the slider; and a limit switch for reporting a position of the piston, the limit switch being opened and closed by a dog mounted on one end of the piston;

wherein a traveling piston is slidably disposed in the cylinder, coaxially adjacent to the piston thereby forming hydraulic chambers.

3. A spindle position orientation apparatus of a boring machine comprising:

a main spindle rotatably disposed in a casing; a cylindrical cam fixed around the main spindle;

a slider disposed on a guide rod for moving right and left thereby engaging and rotating the cylindrical cam;

a piston disposed in a hydraulic cylinder fixed to the casing, the piston having one end thereof fixed to the slider; and a limit switch for reporting a position of the piston, the limit switch being opened and closed by a dog mounted on one end of the piston;

wherein the cylindrical cam has raised position orientation projections forming a gap therebetween at one end of the cylindrical cam; and raised correcting projections smaller than the position orientation projections, having their vertices not aligned with the vertices of the position orientation projections, and located at the other end of the cylindrical cam.

* * * * *